United States Patent [19]

Löfgren et al.

[11] 4,346,054
[45] Aug. 24, 1982

[54] FLUIDIZABLE BED APPARATUS

[75] Inventors: Lars Löfgren; Artur Östlund, both of Linköping, Sweden

[73] Assignee: Stal-Laval Apparat AB, Linköping, Sweden

[21] Appl. No.: 243,449

[22] Filed: Mar. 13, 1981

[30] Foreign Application Priority Data

Mar. 21, 1980 [SE] Sweden .............................. 8002199

[51] Int. Cl.³ .................... B01J 8/44; F26B 17/10; F23C 11/02
[52] U.S. Cl. ................................. 422/49; 34/57 A; 110/245; 165/104.16; 422/143; 422/146; 431/170; 432/58
[58] Field of Search ...................... 422/49, 143, 146; 431/7, 170; 122/4 D; 110/245; 165/104.16; 34/57 A; 432/15, 5 B; 201/31

[56] References Cited

U.S. PATENT DOCUMENTS 1,691,609 11/1928 Oskrit ........................... 443/262 X
3,398,718 8/1968 Pilloton ........................ 422/146 X
3,814,178 6/1974 Parussel ........................... 165/158
3,890,935 6/1975 Moss et al. ..................... 422/143 X

FOREIGN PATENT DOCUMENTS 643905 7/1962 Canada ............................. 422/49

Primary Examiner—Barry S. Richman
Attorney, Agent, or Firm—Watson, Cole, Grindle & Watson

[57] ABSTRACT

A fluidizable bed apparatus comprises a container containing a bed of fluidizable particulate material which becomes hot in use. The apparatus is characterized in that it includes at least one passage for the flow of cooling medium therethrough arranged beneath a bottom wall of the container. The or each passage has communicating therewith at least one inlet, preferably arranged beneath the bottom wall, and at least one outlet, preferably arranged adjacent side walls of the container. Nozzles for supplying fluidizing medium to the container for fluidizing the bed are arranged to pass through the bottom wall of the container.

13 Claims, 2 Drawing Figures

FLUIDIZABLE BED APPARATUS

TECHNICAL FIELD

This invention relates to a fluidizable bed apparatus of the kind comprising a container containing a bed of fluidizable particulate material which becomes hot in use. One example of the use of such a fluidizable bed apparatus is for the reactor in the reduction process for iron oxide which is described in British Patent Specification No. 1,386,452.

BACKGROUND ART

In known fluidizable bed apparatuses of the kind referred to, in which in use both the bed of fluidizable particulate material and fluidizing medium for fluidizing the bed operate under pressure, e.g. from 6 to 7 bars, and at high temperatures, e.g. typically from 750° C. to 800° C., there arise several problems associated with the temperature attained by, and the strength of, the distributing system for supplying the fluidizing medium to the container to fluidize the bed of particulate material.

The present invention aims to provide a solution to the above-mentioned problems and other problems associated therewith.

DISCLOSURE OF THE INVENTION

According to one aspect of the present invention a fluidizable bed apparatus comprises a container containing a bed of fluidizable particulate material which becomes hot in use, the container having a bottom wall and side walls, means for passing a fluidizing medium through the bottom wall and into the container to create a fluidized bed of the particulate material, passage means arranged at least partly beneath the bottom wall to provide, between the bottom wall and the passage means, at least one passage for the flow therethrough of a cooling medium to cool the bottom wall, inlet means for supplying a cooling medium to the at least one passage, and outlet means for withdrawing from the at least one passage cooling medium supplied to the at least one passage via the inlet means.

Conveniently the means for passing a fluidizing medium through the bottom wall comprises a plurality of nozzles. Suitably the fluidizable bed apparatus further comprises plenum means (conveniently forming a unitary structure with the passage means) arranged beneath the or each passage to provide at least one plenum chamber for distributing the fluidizing medium to the nozzles, the lower ends of the nozzles communicating with the plenum chamber(s). Typically the nozzles are provided with flanges to enable them to be detachably secured to the plenum means, a gasket being provided between each nozzle flange and the plenum means. With such a construction of fluidizable bed apparatus, all the pressure-carrying parts may be effectively insulated against heat. Furthermore, the gaskets for the nozzles need only withstand the pressure caused by the pressure drop across the nozzles.

According to another aspect of the present invention, a fluidizable bed apparatus comprises a container containing a bed of fluidizable particulate material which becomes hot in use, the container having a bottom wall and side walls, a unitary structure arranged at least partly beneath the bottom wall and including surface means spaced beneath the bottom wall to define therewith at least one passage for the flow therethrough of a cooling medium to cool the bottom wall, inlet means for supplying a cooling medium to the at least one passage, outlet means for withdrawing cooling medium supplied to the at least one passage, a plurality of tubular fixing means secured between the bottom wall and the unitary structure, and a plurality of nozzles secured to the unitary structure for introducing a fluidizing medium into the container to create a fluidized bed of the particulate material, each nozzle passing through respective ones of the tubular fixing means and through respective through opening provided by opening means in the bottom wall.

BRIEF DESCRIPTION OF THE DRAWINGS

The invention will now be described, by way of example, with reference to the accompanying drawing, in which.

DESCRIPTION OF THE PREFERRED EMBODIMENTS

Figure 1:
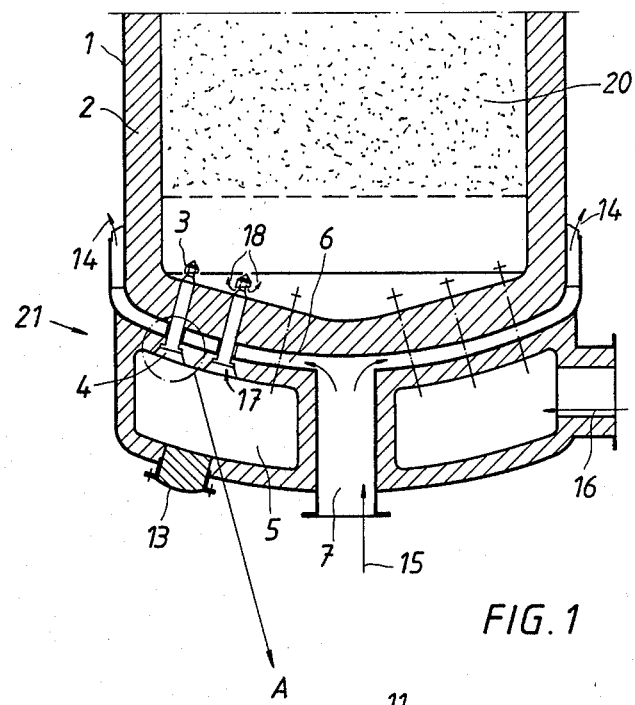
FIG. 1 is a sectional view of the lower part of a fluidizable bed apparatus according to the invention.

FIG. 1 shows the lower part of a fluidizable bed apparatus comprising a container having a bottom wall and side walls and containing a bed 20 of fluidizable particulate material. The container comprises an external casing 1, which is suitably made of metal, lined internally with a heat-insulating material 2. The fluidizable bed apparatus further comprises a unitary structure, generally designated 21, arranged at least partly beneath the bottom wall of the container and a plurality, for example six, of nozzles 3 carried by the unitary structure 21 and projecting through openings formed in the bottom wall of the container. The fluidizable bed apparatus shown may constitute part of a reactor, for example, of the type described in British patent specification No. 1,386,452, in which the bed 20 may be heated to temperatures of from 750° C. to 800° C.

The unitary structure 21 is substantially uniformly spaced beneath the bottom wall of the container to provide a passage 6, in the form of a gap, channel or disc-shaped space, between the unitary structure and the bottom wall for the flow therethrough of a cooling medium. In most applications air is the preferred cooling medium although other cooling mediums, e.g. water, may be used in other applications. The cooling medium is supplied to the passage 6 via an inlet channel 7 (see arrows 15) and is withdrawn from the passage 6 through at least one outlet (see arrows 14) adjacent the bottom of the side walls of the container. Of course, it is also possible to reverse the direction of cooling medium flow, such that the channel 7 would become the outlet and the directions of arrows 15 and 14 would be reversed. The cooling medium is suitably circulated through the passage by circulating means (not shown). The circulating means may merely comprise a self-circulating system or may include means, e.g. a pump or compressor, for generating a circulating pressure. In the embodiment of the fluidizable bed apparatus shown, the side walls of the container define a substantially circular cylindrical surface and the inlet channel is disposed axially of the cylindrical surface.

The unitary structure 21 further includes wall means arranged beneath the passage 6 to define an internally heat-insulated plenum chamber 5. The lower ends of the nozzles 3 are mounted in the upper wall of the unitary structure 21 so that the inlet 4 of each nozzle 3 communicates with the plenum chamber 5. Fluidizing medium in the form of a fluidizing or carrier gas is supplied (as shown at arrow 16) under pressure, e.g. from 6 to 7 bars, to the chamber 5. The fluidizing medium is then passed from the chamber 5 to the inside of the container via the nozzles 3, the fluidizing medium entering the nozzles 3 at 17 and exiting therefrom at 18 to fluidize the bed 20. Although only one plenum chamber 5 is shown for distributing the fluidizing medium to the nozzles 3, it will be appreciated that more than one such plenum chamber may be provided.

Figure 2:
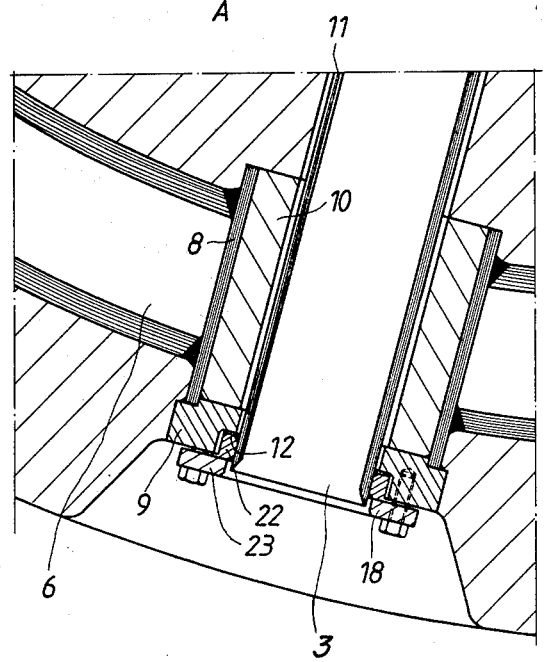
FIG. 2 is an enlarged sectional view of the detail A shown in FIG. 1.

FIG. 2 shows how the unitary structure 21 is connected to the bottom wall of the container. A plurality, for example six, of metallic tubes 8 (only one of which is shown in FIG. 2) are welded to the casing 1 and the upper wall of the unitary structure 21 to provide a rigid connection between the unitary structure 21 and the bottom wall of the container. The lower end of each tube 8 has a flange 9 fixed therearound which is seated in the thermally-insulating material surrounding the plenum chamber 5. The inside of each tube 8 is thermally insulated with heat-insulating material 10.

Each nozzle 3 comprises a nozzle tube 11, typically of metallic material, having a flange 22 secured around its lower end. A securing ring 23 is detachably fixed, e.g. bolted, to the flange 9 to clamp the flange 22 against the flange 9. In order to provide a good seal a gasket 12 is positioned between the flanges 9 and 22.

With the above-described construction of fluidizable bed apparatus, all the pressure-carrying parts (e.g. the container, the nozzles 3 and the plenum chamber 5) may be effectively insulated against heat. Furthermore the gaskets 12 for the nozzles 3 need, for example, only withstand the pressure that is caused by the pressure drop across the nozzles. By providing the plenum chamber 5 with suitably located manholes 13, the nozzles 3 may be replaced without it being necessary to gain access to the interior of the container. It will be appreciated that in order to replace a nozzle 3 it is only necessary to open the manhole 13 and unbolt the securing ring 23. The nozzle 3 can then be withdrawn from its mounting in the unitary structure 21.

More than one passage 6 for cooling medium may be provided although it is preferred that a single disc-shaped space or gap is provided having an at least substantially radial extension and being substantially uniformly spaced from the bottom wall of the container. A suitable fluidizing medium is $CO_2$ or $N_2$ and, as mentioned previously, air is an important coolant. The number of nozzles 3 may be varied in many ways. The fluidizable particulate material may be in the form of powder, grains or granules.

The apparatus according to the invention may be varied in many other ways within the scope of the appended claims.

What is claimed is:

1. A fluidizable bed apparatus comprising:
 a container containing a bed of fluidizable particulate material which becomes hot in use, the container having a bottom wall and side walls;
 a unitary structure arranged at least partly beneath said bottom wall and including surface means spaced beneath the bottom wall to define therewith at least one passage for the flow therethrough of a cooling medium to cool said bottom wall;
 inlet means for supplying a cooling medium to each said passage;
 outlet means for withdrawing cooling medium supplied to each said passage;
 at least one tubular fixing means secured between said bottom wall and the unitary structure, each said tubular fixing means having a uniform diameter along its length; and
 at least one nozzle secured to the unitary structure for introducing a fluidizing medium into said container to create a fluidized bed of said particulate material, each said nozzle passing through a respective tubular fixing means and through a respective through-opening provided by opening means in said bottom wall.

2. A fluidizable bed apparatus according to claim 1, wherein each said passage is spaced a substantially uniform distance beneath the external surface of said bottom wall to define at least one flow channel of substantially uniform thickness extending beneath the entire bottom wall.

3. A fluidizable bed apparatus according to claim 1, in which each tubular fixing means includes heat-insulating means surrounding its associated nozzle.

4. A fluidizable bed apparatus according to claim 1, wherein said outlet means is arranged to communicate with each said passage adjacent said side walls of the container and wherein said inlet means is arranged to communicate with each said passage beneath said bottom wall.

5. A fluidizable bed apparatus according to claim 4, wherein said side walls provide a substantially circular cylindrical surface and wherein said inlet means is arranged to communicate with each said passage on the axis of said circular cylindrical surface, each said passage having a radial extent.

6. A fluidizable bed apparatus according to claim 1, comprising plenum means arranged beneath each said passage and defining at least one plenum chamber, the lower end of each nozzle communicating with a said plenum chamber.

7. A fluidizable bed apparatus according to claim 6 wherein said plenum means is formed as a part of unitary structure.

8. A fluidizable bed apparatus according to claim 7, wherein each said nozzle passes through opening means providing openings in said unitary structure and are mounted in said plenum means.

9. A fluidizable bed apparatus according to claim 8, wherein said plenum means includes heat insulating means for heat insulating each said plenum chamber.

10. A fluidizable bed apparatus according to claim 8, comprising flange means secured to each nozzle and fixing means for detachably securing each flange means to said plenum means.

11. A fluidizable bed apparatus according to claim 8, in which the plenum means includes opening means providing closable openings to facilitate access to each said plenum chamber.

12. A fluidizable bed apparatus comprising:
 a container containing a bed of fluidizable particulate material which becomes hot in use, the container having a bottom wall and side walls;
 a unitary structure arranged at least partly beneath said bottom wall and including surface means spaced beneath the bottom wall to define therewith at least one passage for the flow therethrough of a cooling medium to cool said bottom wall;
 inlet means for supplying a cooling medium to each said passage;

outlet means for withdrawing cooling medium supplied to each said passage;

a plurality of tubular fixing means secured between said bottom wall and the unitary structure; and a plurality of nozzles secured to the unitary structure for introducing a fluidizing medium into said container to create a fluidized bed of said particulate material, each said nozzle passing through a respective tubular fixing means and through a respective through-opening provided by opening means in said bottom wall.

13. A fluidizable bed apparatus according to claim 12, in which said unitary structure includes wall means defining at least one plenum chamber for supplying a fluidizing medium to said nozzles.

* * * * *